United States Patent [19]
Dunn et al.

[11] Patent Number: 5,213,165
[45] Date of Patent: May 25, 1993

[54] FOLDING LAND PLANE

[75] Inventors: Neil C. Dunn, Carlisle; Edward O. Brandt, Batesville; James E. Burks, Hazen, all of Ark.

[73] Assignee: Brandt Manufacturing Co., Inc., Carlisle, Ark.

[21] Appl. No.: 793,593

[22] Filed: Nov. 18, 1991

[51] Int. Cl.$^5$ .......................... A01B 73/04; E02F 3/76
[52] U.S. Cl. ................................. 172/799.5; 172/311; 172/481; 172/684.5
[58] Field of Search ...................... 172/311, 456, 799.5, 172/445.1, 481, 684.5

[56] References Cited

U.S. PATENT DOCUMENTS

| | | | |
|---|---|---|---|
| Re. 31,209 | 4/1983 | Anderson | 172/311 |
| 897,905 | 9/1908 | Kinkade | 172/456 |
| 1,166,197 | 12/1915 | Elsey | 172/799.5 |
| 1,385,789 | 7/1921 | Miller | 172/799.5 |
| 1,876,867 | 9/1932 | Dean | 172/701.3 |
| 2,142,262 | 1/1939 | Beckham et al. | 172/799.5 X |
| 2,972,385 | 2/1961 | Walberg | 172/456 X |
| 3,692,121 | 9/1972 | Kenney | 172/456 |
| 3,814,191 | 6/1974 | Tilbury | 172/311 |
| 4,236,586 | 12/1980 | Shader et al. | 172/456 X |
| 4,415,043 | 11/1983 | Hadler et al. | 172/311 X |

Primary Examiner—Dennis L. Taylor
Assistant Examiner—Jeffrey L. Thompson
Attorney, Agent, or Firm—Stephen D. Carver

[57] ABSTRACT

A multi-section, foldable land plane is foldable between a relatively narrow, transportable position, and a wider, deployed position for leveling field irregularities. A central, wheeled frame is adapted to be drawn by a conventional tractor. The frame, constructed of a network of tubular steel members, supports a pair of lateral wings which can be selectively folded and unfolded over the central frame. Folding of the wings is controlled by a system of hydraulic cylinders. The hydraulic cylinders are coupled to pivotal cam arms that control upward and outward rotation of the wings relative to the frame. A deflection compensation system insures proper wing movement during movements. An automatically actuated locking system prevents undesired deflection of the wings during operation. The locking system is activated by a second pair of hydraulic cylinders that control a master locking position that is linked to remote, slave locking positions by an elongated synchronizer. A plurality of rigid plane blades cooperate to define a soil flow pathway beneath the frame. Each of the blades is independently adjustable for height and pre-tension, accommodating the condition of the field. Soil scraped from elevated areas is channeled backwards along the blades and subsequently deposited into depressed areas of the field and compacted by the blades.

5 Claims, 7 Drawing Sheets

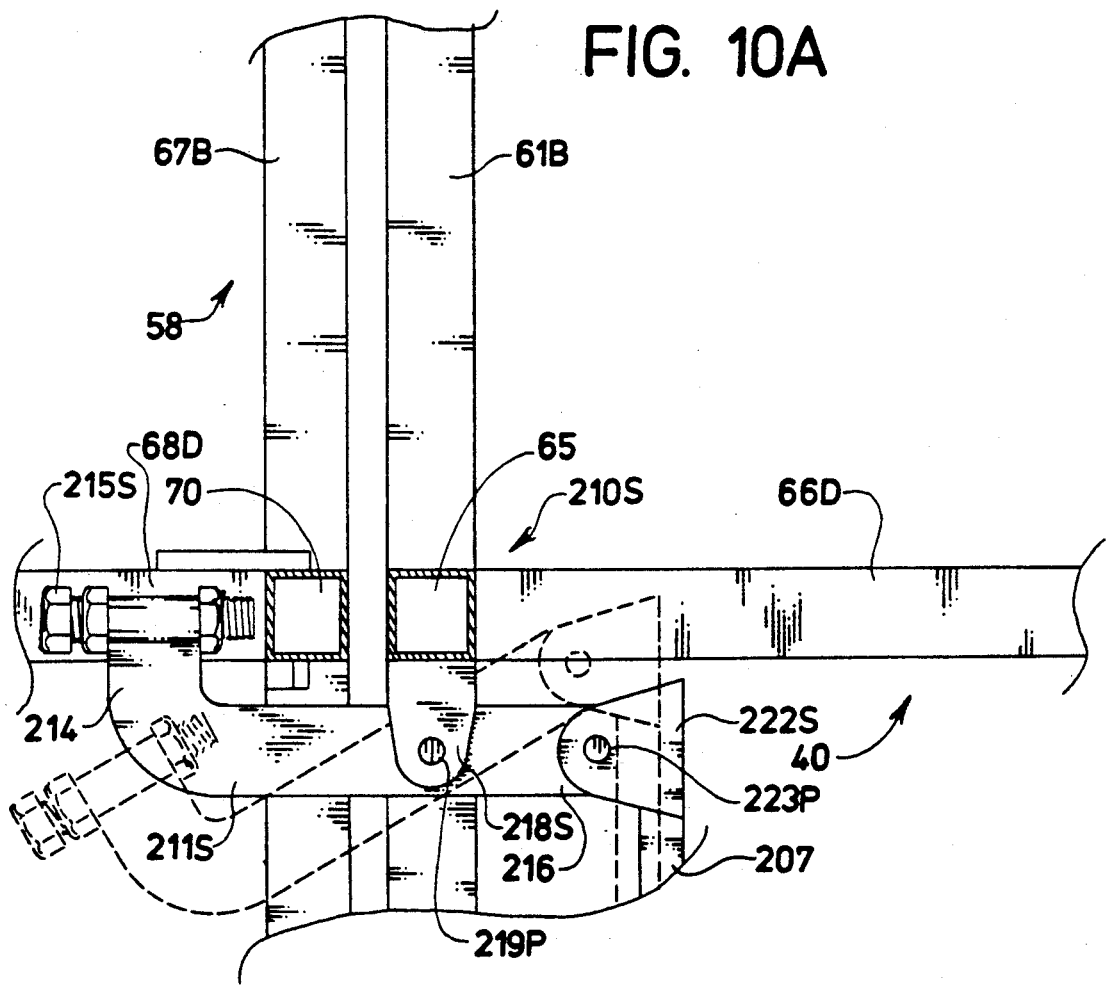

FOLDING LAND PLANE

BACKGROUND OF THE INVENTION

The present invention relates broadly to agricultural leveling implements for eliminating surface irregularities. More specifically, the present invention relates to a land plane that is foldable between a narrow, transport position and a wider, deployed position.

As will be appreciated by those skilled in the agricultural arts, it is generally desirable to provide a level field free of obstructions and major surface irregularities. Such irregularities may result, for example, from tilling, aeration, and harvesting procedures as well as from natural causes such as extreme winds or rains. If a field is not properly leveled for cultivation, crops may suffer from a variety of causes. Crops may be seriously affected by surface irregularities resulting in standing water, flooding, leeching, excessive runoff, or the like. It is particularly critical that the land be leveled to control water flow through and upon a cultivated area. For example, strict control of water flow is critical for the proper irrigation and flooding of rice. If the field is marked with surface irregularities at the outset, the rice farmer will have difficulty defining proper flood levees. Hence, it is desired to provide an implement for leveling a field surface to be cultivated.

In the prior art, various land planes have been proposed. However, there are various disadvantages associated with known prior art land planes. Importantly, the prior art planes are restricted in width, because any agricultural implement cannot exceed the sixteen to eighteen foot width required to traverse rural roads or highways. Hence the width of prior art land planes is generally limited to sixteen or eighteen feet. To achieve a satisfactory leveling, the farmer must pass the narrow leveling blade over the field numerous times and in various directions to achieve a fully level surface. This procedure involves substantial effort and expense.

Moreover, because of their limited size, known prior art planes do not provide sufficient drag to properly level hardened surfaces. Hence, it is desired to provide a land plane which covers a substantially larger area in a single pass, but which may be conveniently and legally towed over adjacent access roads. Moreover, it is desired to provide a plane that avoids creation of irregularities such as tire ruts and the like.

The use of foldable wings to define a broader tool carriage is well known in the art. A wide variety of foldable implement carriages have been proposed which can be collapsed for convenient transport on public roads. However, none of the prior art implements known to me satisfactorily addresses the need for a conveniently foldable, broad-based land plane.

Multi-section earth working implements comprising a foldable tractor-driven framework are disclosed in U.S. Pat. Nos. 3,529,674 issued Sep. 22, 1970 to Todd; No. 3,640,345 issued to Sosalla on Feb. 8, 1972; and No. 3,944,001 issued to Warner on Mar. 16, 1976. Ankenman teaches a foldable implement comprising a pair of trailing wings for controlling oscillation in U.S. Pat. No. 3,990,521 issued Nov. 9, 1976.

A tillage implement comprising a pair of folding, offset beams is disclosed by Anderson U.S. Pat. No. 4,327,932 issued May 4, 1982. A foldable offset seed drill is disclosed in U.S. Pat. No. 4,660,651 issued Apr. 28, 1987 to Fenninger. Frager U.S. Pat. No. 3,830,313 issued Aug. 20, 1974 and Poland U.S. Pat. No. 3,828,860 issued Aug. 13, 1974 both disclose folding implement frames for transporting a plurality of disk harrow arms. The arms project radially from the foldable frame in at least four directions. The purpose of the latter-described arrangement is to compete turning of the soil in various directions.

While folding agricultural devices are disclosed in the prior art, none known to me teaches a foldable land plane that is capable of correcting surface irregularities across a large sector of the field in a single pass. Moreover, none provides structure that adequately prepares a wide land surface for irrigation levees.

SUMMARY OF THE INVENTION

The present invention relates to a foldable, multiple-blade land plane for leveling a field to be cultivated. The plane is adapted to be coupled to a conventional tractor or the like for transport and subsequent use upon a field. It may be deployed in either a relatively narrow transportable position, and upon reaching the field it may be folded to a substantially wider deployed orientation.

The plane comprises an elongated, wheeled, open central frame which supports a pair of foldable wings. Preferably the frame and wings form an open framework of tubular steel or the like reinforced by rigid cross braces. This lightweight construction is extremely advantageous, since it is durable, highly maneuverable, and economical.

The wings may be selectively raised and lowered between a folded, transport position and an open, deployed position. In the deployed position, the plane preferably spans a width of roughly twenty-four feet. Thus the plane is capable of leveling a large area of the field in a single pass.

Wing movement is controlled by a system of hydraulic cylinders which are preferably remotely controlled from the tractor. Hydraulic rams are pivotally coupled to cam-like pivot assemblies which rotate the wings upwardly and outwardly relative to the central frame. The path of wing rotation is defined both by extension of the hydraulic rams and action of deflection compensation system. Cam arms are deflected into and out of a rigid guide associated with the central frame. Rollers deflect the ram and cam arm into and out of the guide.

A plurality of leveling blades are adjustably mounted to the frame and wings. The blades cooperate to define an angular path of soil flow within the frame. Soil scraped from elevated areas of the field is carried backward by the blades through the frame, and is deposited and compacted into depressed areas of the field which the plane subsequently traverses. The blades may be conveniently adjusted for height and pre-tension depending on the condition of the field.

A mechanical locking system controlled by hydraulic cylinders associated with the interior frame prevents undesired deflection of the foldable wings during operation. Activation of the hydraulic cylinders moves elongated synchronizers which simultaneously activate a plurality of locking arms. The locking arms are pivotally coupled to the synchronizer and extend outwardly over the wings to control wing deflection during use. The height of allowable wing deflection is selectively controlled by tightening or loosening of an adjustment bolt assembly associated with each locking arm.

It is therefore a broad object of our invention to provide a land plane that can be conveniently folded between a narrow transportable orientation and a wider, deployed position.

Another basic object of the present invention is to provide a foldable land plane which can be conveniently transported and controlled by a conventional tractor.

Similarly, it is an important object to provide a land plane that can be remotely switched between planing and transportable orientations by the farmer without dismounting the tractor.

An additional object of the present invention is to provide an efficient land leveling implement which eliminates surface irregularities in fewer number of passes than known prior art planes.

A further object of the present invention is to provide a land plane which can be folded for convenient transport on conventional roadways.

Another object of the present invention is to provide a folding land plane that carefully defines and limits wing movement.

Yet another object of the present invention is to provide a surface-leveling implement which activates a plurality of offset, planing blades simultaneously for improved planing action.

Still another object of the present invention is to provide a highly efficient, transportable land plane which can be quickly deployed for use on various types and sizes of fields.

An additional object of the present invention is to provide a foldable, tractor-driven land plane implement which may be automatically adjusted for use on different terrains.

A further object of the present invention is to provide an improved land plane comprising multiple leveling blades for simultaneously planing in various directions at a single pass.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 10A is an enlarged, fragmentary, sectional view similar taken generally along line 10A—10A of FIG. 6, illustrating synchronized, slave portions of the preferred locking system in a locked position;

DETAILED DESCRIPTION OF THE DRAWINGS

Figure 1:
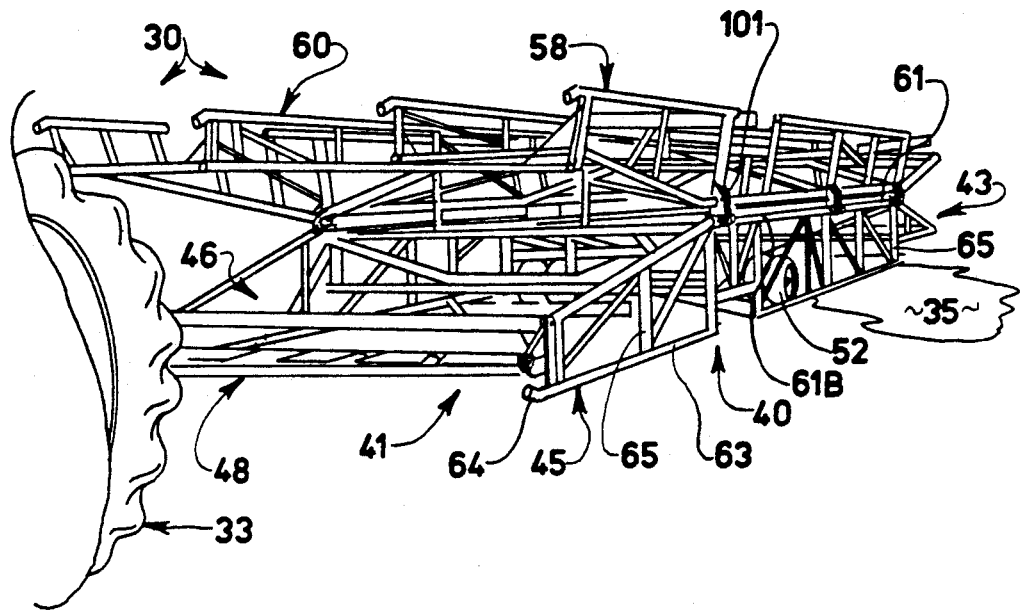
FIG. 1 is a fragmentary perspective view illustrating the best mode of our new FOLDING LAND PLANE in the folded, transport position.

With reference now directed to the accompanying drawings, the best mode of our new folding land plane is broadly designated by the reference numeral 30. As seen in FIG. 1, plane 30 is drawn by a conventional tractor 33 to a field 35 to be leveled. For convenient towing down public roads the land plane is deployed in the folded, reduced width transport position shown in FIG. 1. Upon reaching the field it is subsequently unfolded into the maximum-width, deployed position shown in FIGS. 2 and 3. Folding, unfolding, and wing locking is accomplished remotely from the tractor without dismounting.

Figure 2:
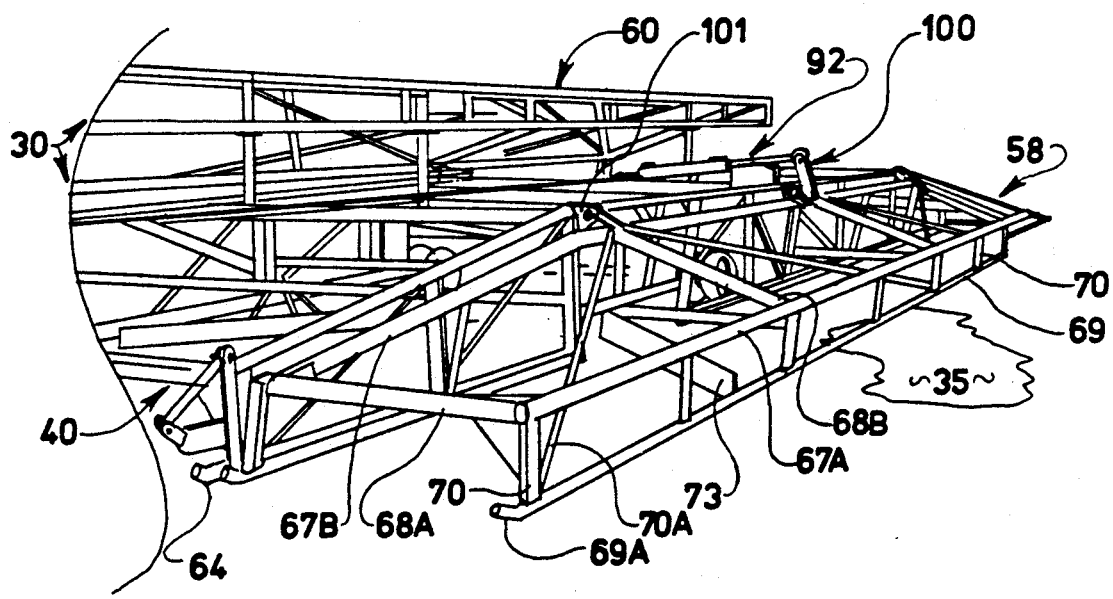
FIG. 2 is a similar perspective view illustrating partial deployment in which one wing has been fully unfolded into the operative position.
Figure 3:
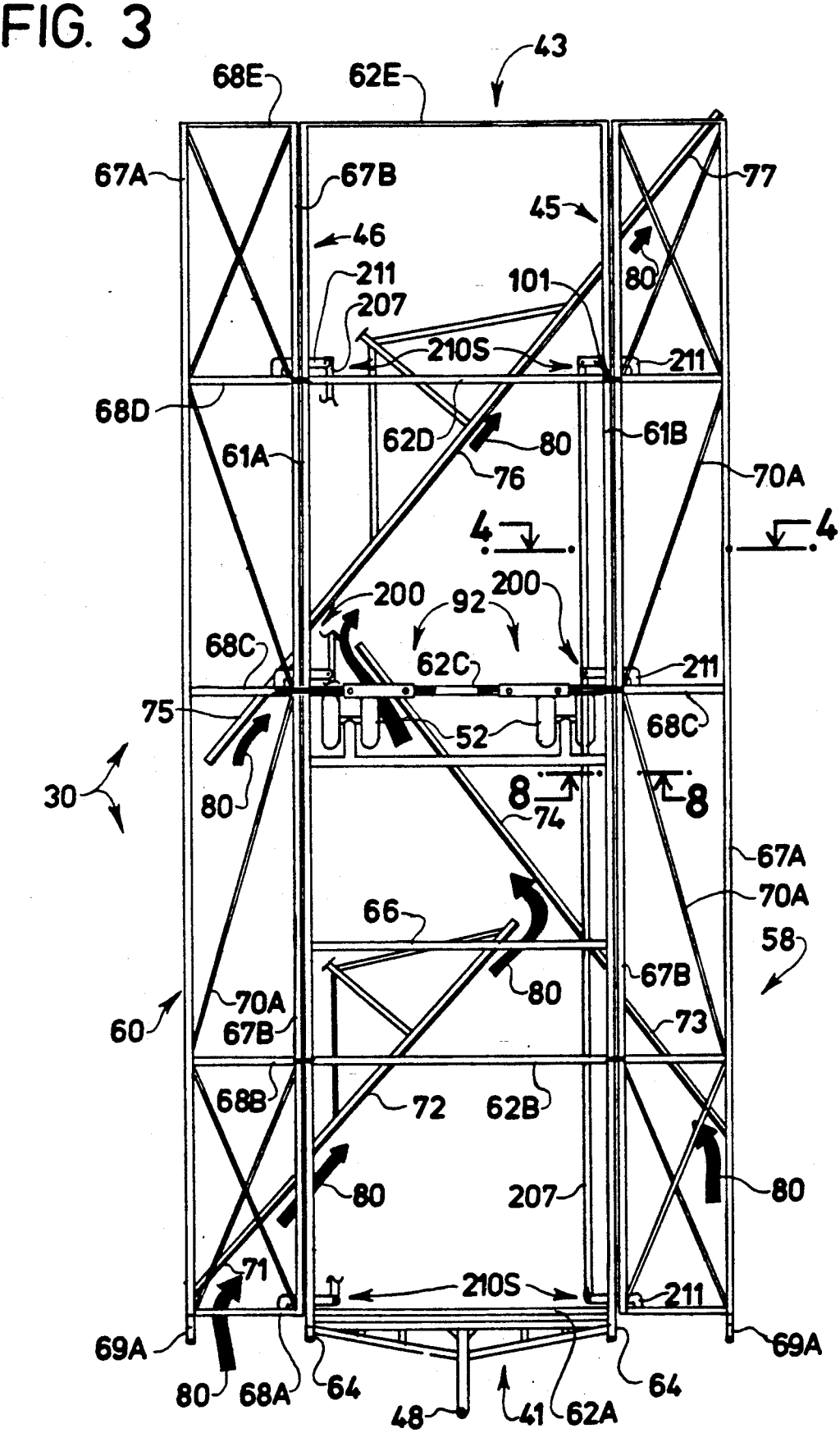
FIG. 3 is a fragmentary top plan view illustrating the plane in a fully deployed position.

With reference to FIGS. 1-3, plane 30 preferably comprises an elongated, cross-braced center frame broadly designated by the reference numeral 40. Frame 40 is generally in the form of a parallelepiped. The box-like frame comprises a front, tow end 41, a rear end 43, and a pair of spaced -apart, generally parallel, truss-like sides 45, 46. Front end 41 comprises a reinforced tow bar 48 adapted to be coupled to the tractor. It may be hitched to a conventional ball mount, three-point hitch, or the like. The center frame 40 is conventionally transported upon pairs of centrally disposed transport wheels 52.

Each of the frame sides 45, 46 mounts a lateral wing, broadly designated by the reference numerals 58 and 60, respectively. Both of the cross-braced wings are generally in the form of a parallelepiped. When the plane 30 is delivered to field 35, a hydraulic control system broadly designated by the reference numeral 92 rotates the wings 58, 60 upwardly and outwardly from center frame 40. When so rotated, wings 58, 60 both drop to rest along sides 45, 46 of the frame 40, as best viewed in FIG. 3. In the best mode, the fully opened plane comprises an overall width of roughly twenty-four feet. Thus the operator can level a large portion of the field 35 in a single pass.

Preferably central frame 40 and wings 58, 60 are constructed of a multiplicity of interconnected hollow, tubular steel pipes, such as pipes 61 and cross members 62. Longitudinal pipes 61A, 61B form upper side shoulders of the center frame 40. Cross pieces 62A, 62E (FIG. 3) form the upper ends of central frame 40. Intermediate upper cross braces 62B, 62C, and 62D and lower cross braces 66 (FIGS. 4-6) extend across the frame between the longitudinal frame members 61A, 61B and terminate in vertical support members 65, which project downwardly at various points between the upper frame members and the spaced apart, elongated sleds 63. Sleds 63 terminate in upwardly angled feet 64 define the lower frame periphery and permit the land plane to ride smoothly over the field's surface without it anchoring in the soil.

Wings 58, 60 comprise elongated longitudinal shoulders 67A, 67B, intersecting end braces 68A and 68E, and intermediate cross braces 68B, 68C, and 68D. Spaced apart sleds 69 terminating in upwardly angled feet 69A slide along the field's surface when the wings are deployed. Vertical supports 70 connect the tubular wing members to the sleds 69, and a plurality of supportive reinforcement struts 70A extend diagonally between wing members to lend structural stability to the wings.

This open frame construction is advantageous, because it is lightweight, economical, and highly maneuverable. This construction also facilitates access to the various working components of the plane for routine cleaning, maintenance, or repair.

As best viewed in FIG. 3, frame 40 and wings 58, 60 support a plurality of spaced apart, interactive planing blades 71-77 to be described in detail hereinafter. Blades 71-77 are positioned generally diagonally across the frame and wings. Blades 71 and 75 are mounted to wing 60, and blades 73 and 77 are associated with wing 58. The central frame 40 mounts elongated interior blades 72, 74, and 76. Each blade is offset from the blade directly before it by roughly three to twenty inches. The offset configuration prevents dirt, grass, and debris scraped from the field's surface from becoming jammed between the wing and central frame blades. In addition, the offset blade arrangement prevents the formation of undesired ridges on the field. Each blade is independently adjustable for height and tension as described hereinafter.

As the plane moves forward across a field 35, blades 71-77 comb across the land's surface, smoothing surface irregularities by channeling dirt along and across the blades 71-77. Elevated areas such as dirt mounds on the field are impacted by the blades and razed. Excess soil gathered in the process is carried through frame 40 by blades 71-77 along an angular path indicated by arrows 80 toward the frame rear 43. The loosened soil is subsequently deposited and compacted into depressions in the soil surface by the passing blades.

Figure 4:
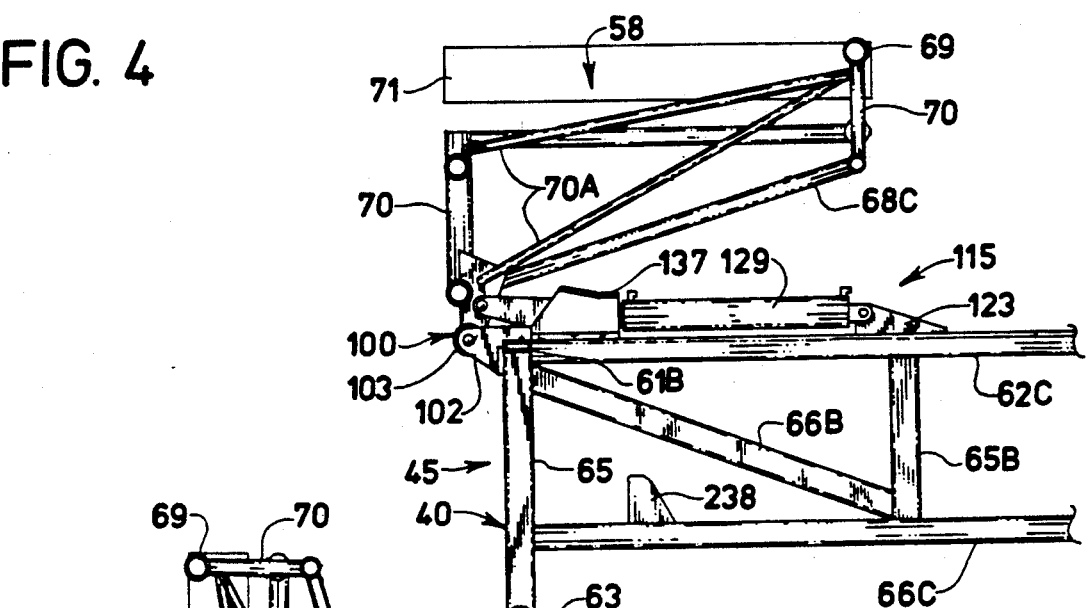
FIGS. 4-6 are enlarged, fragmentary, sectional views taken generally along line 4—4 of FIG. 3, and respectively illustrating a typical wing in a transportable position, an intermediate position, and a deployed position.

With additional reference now to FIGS. 4-9, wing assemblies 58, 60 are rotatably coupled to central frame 40. The wings 58, 60 pivot between the transport position of FIGS. 1 and 4 to the deployed position of FIGS. 3 and 6. Wings 58, 60 are pivotally coupled to central frame 40 by a folding system broadly including master folding linkage 100 and spaced apart slave linkages 101 (FIG. 2, 3). Master linkage 100 is centrally located at each side of the central frame. It is associated with opposite ends of the central cross member 62C. Slave linkages 101 couple the wings to the central frame at cross members 62B, 62D (FIG. 3). As best viewed in FIGS. 2 and 6, wing braces 68A-68E taper downwardly toward and away from the central frame, thus providing adequate clearance for folding (FIG. 4).

The master linkage comprises a rigid, fixed, two-piece bracket 102 (FIGS. 8-9) that projects outwardly from the central frame sides 45, 46. Bracket 102 comprises a first plate 102A (FIGS. 8, 9) and a spaced apart second parallel plate 102B (FIG. 7) between which a captured roller wheel 103 is journalled for rotation by axle 104P. The interior end of bracket 102 is welded to the central frame member 61B. Roller 103 projects outwardly beyond bracket 102 and is contacted by the linkage as described hereinafter. Bracket 102 also pivotally restrains a rigid, generally triangular pivot plate 104 that is welded to the wing. Rotation of the wings is preferably remotely controlled by activation of hydraulic folding system 92.

Hydraulic system 92 comprises a pair of hydraulic cylinders 115, which are pivotally mounted on each side of the frame, one for each wing. For purposes of clarity herein, one cylinder will be described and it shall be understood that both are thereby disclosed. Conventional hydraulic supply lines 115B (FIGS. 8,9) connect the cylinders 115 to conventional controls preferably conveniently mounted within the tractor 33. Each cylinder 115 is secured to the upper central cross brace of the frame 62C by a rigid pivot bracket 123. The cylinder 115 comprises a cylindrical outer sleeve 129 that coaxially houses a telescoping ram 133. Ram 133 projects outwardly toward wing 58 or 60. Ram 133 is rotatably coupled to an elongated, rigid cam arm 140, which is in turn pivotally coupled to pivot plate 104 on wing 58 or 60. The interior end of pivot plate 104 and roller 103 establish a first pivot point 104P. Cam arm 140 comprises a second pivot point 140A at which the arm is coupled to the hydraulic ram 133. A third pivot point 140B exists where arm 140 is rotatably coupled to the pivot plate 104.

Figure 7:
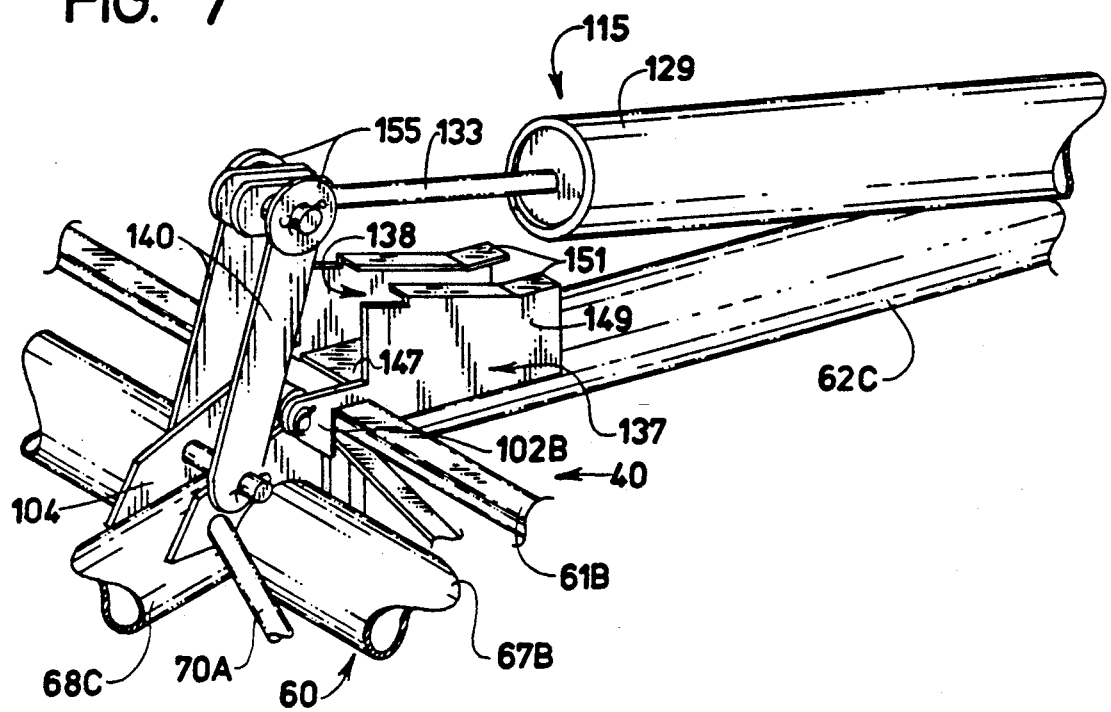
FIG. 7 is an enlarged, fragmentary, perspective view showing the preferred hydraulic linkage.
Figure 9:
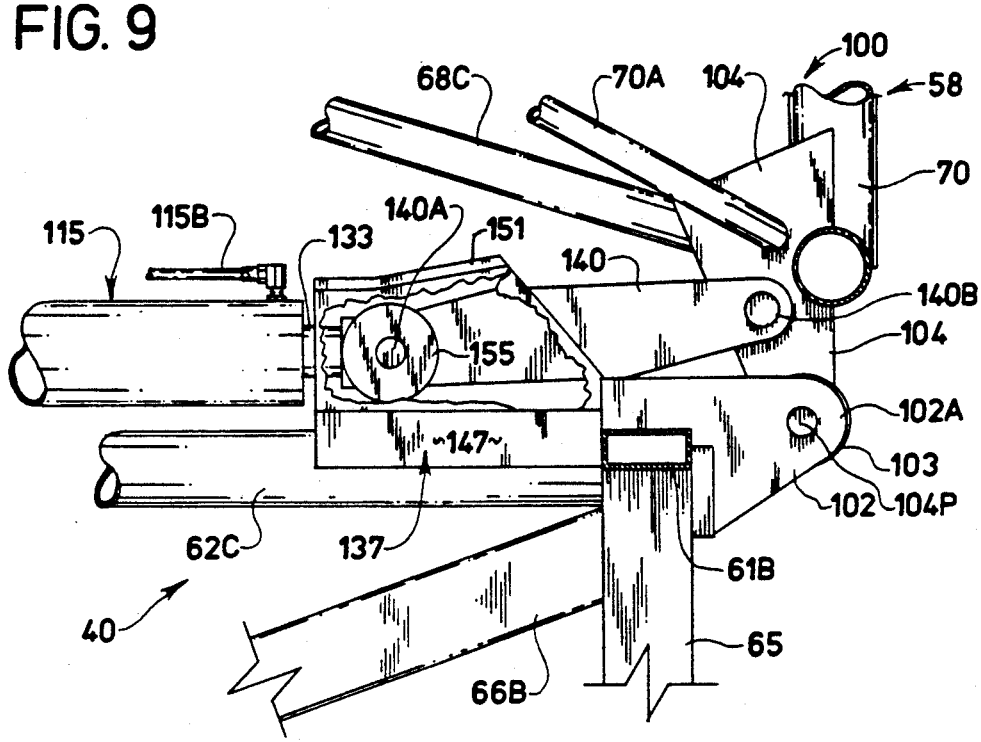
FIG. 9 is a fragmentary, sectional view similar to FIG. 8, but illustrating the wing folded upwardly into the reduced-width transport position.
Figure 8:
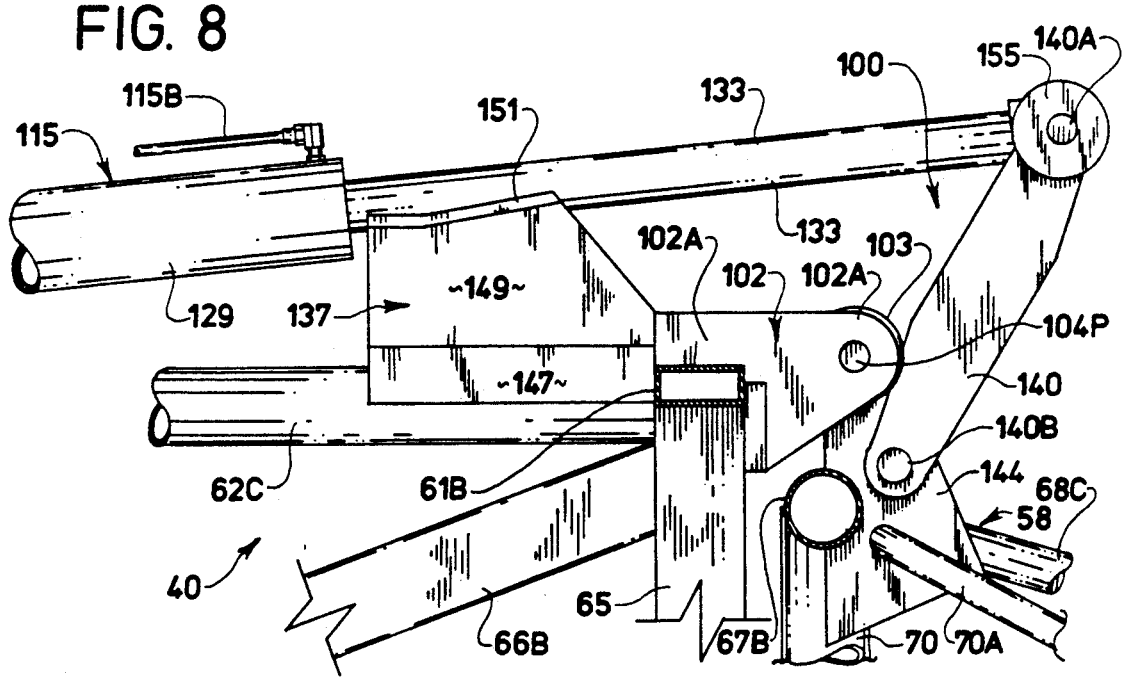
FIG. 8 is an enlarged, fragmentary, sectional view taken generally along line 8—8 of FIG. 3, illustrating deployed wing, in which portions are broken away for clarity.

In the transport position (FIG. 4), ram 133 is retracted as in FIG. 9. When the wings are deployed, they are pivoted over the central frame sides and drop to the ground, with the ram assuming the orientation of FIG. 8. When the ram is retracted to raise a wing, cam arm 140 is protectively drawn into interior 138 of the rigid, box-like guide 137 (FIG. 7). As best viewed in FIGS. 7-9, guide 137 comprises a base plate 147 that is welded to cross member 62C. A pair of rigid, spaced apart side walls 149 project integrally upwardly from the base 147 and terminate at their tops in rigid, inwardly projecting guide flanges 151. Flanges 151 first receive rollers 155 and deflect ram 133 and arm 140 into proper alignment during ram movements. This prevents jamming during lifting and lowering of wings 58, 60. Smooth egress and ingress of the ram through guide 137 is facilitated by enlarged rollers 155 rotatably journalled to between spaced apart arms 140. Rollers 155 act as bearings to guide the ram 133 and arm 140 through and into the guide 137.

Figure 5:
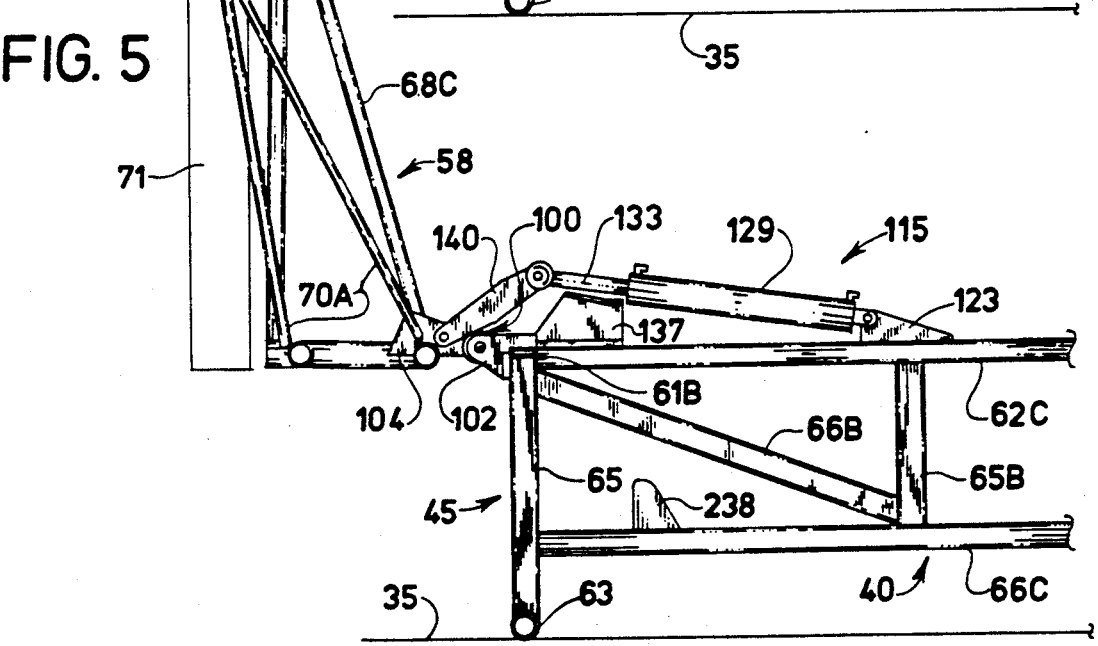

When the wings 58, 60 are lowered, the cylinder 115 will elongate. Rollers 155 initially restrain ram 133 (FIG. 9) and arm 140 against upward pivotal movement until they escape from guide 137 (FIGS. 5, 7). Pressures initially placed upon cam arm 140 by ram 133 rotate pivot plate 104 about point 104P. Arm 140 contacts roller 103 and is deflected upwardly before it moves over to the position of FIG. 8. Roller 103 helps prevent the wing from suddenly dropping under its own weight. The wing is smoothly lowered to its deployed position as the ram 133 projects to full extension. As the ram approaches full extension as viewed in FIG. 6, the wing pivots downwardly by the combined pressure asserted by cam arm 140 and its own weight. When the wing sled 95 rests upon field 35, the ram may yet extend since arm 140 is free to rotate relative to the then-resting plate 104 at 140B. While pressure is so relieved from the hydraulic system, ram deflection compensation is achieved and continued ram movement will not damage the components after the wings are deployed.

The deflection compensation linkage generally refers to parts 103, 104, 140, 137. These parts function to allow the wings to be controlled properly, without part deformation, whether the land plane is initially on level ground or not. For example, then the land plane has been towed to irregular, jagged land, and when ram 133 extends to deploy a wing, it can "over rotate" arm 140 which can "over-pivot" relative to plate 104, so no bending occurs. When folding the wings back to the transport position, the displacement compensation linkage bends arm 140 against the roller wheel and a fulcrum is established. The wing is thus initially urged outwardly and upwardly relative to the central frame member to get it under control. Ram 133 draws arm 140 into rotation about pivot point 104P, so that roller 103 deflects the arm 140 gradually inwardly. As the ram retracts, flanges 151 of the guide 137 contact and deflect rollers 155, drawing the ram and pivot arm back into the interior of guide 137.

The bottom portion of arm 140 forms a lever forcing out the wing laterally relative to the central frame. As arm 140 retracts and revolves about roller 103, the wing is lifted out of the ground and up into the air, describing an arc moving over center to the stable position of FIG. 9. When the wings are raised again to the transport position, cylinder 115 retracts ram 133 inwardly toward the central frame 40. Reliable, efficient, no-slip operation of the wings is thus enabled.

This greatly reduces pressures exerted on the hydraulic cylinders during operation, and thus affords greater efficiency. In the deployed position, the ram 133 projects angularly upwardly and outwardly over the wing, and cam arm 140 is oriented generally vertically relative to the frame side. The scraper blades 71-77 may then be adjusted to the desired weight as described hereinafter.

As best viewed in FIG. 2, the master folding linkage 100 and cylinders are located on the central cross brace 62C. The wings are also pivotally coupled to the central frame 40 by standard rotatable brackets positioned at each of the intermediate cross braces 62D, 62E.

Figure 10:
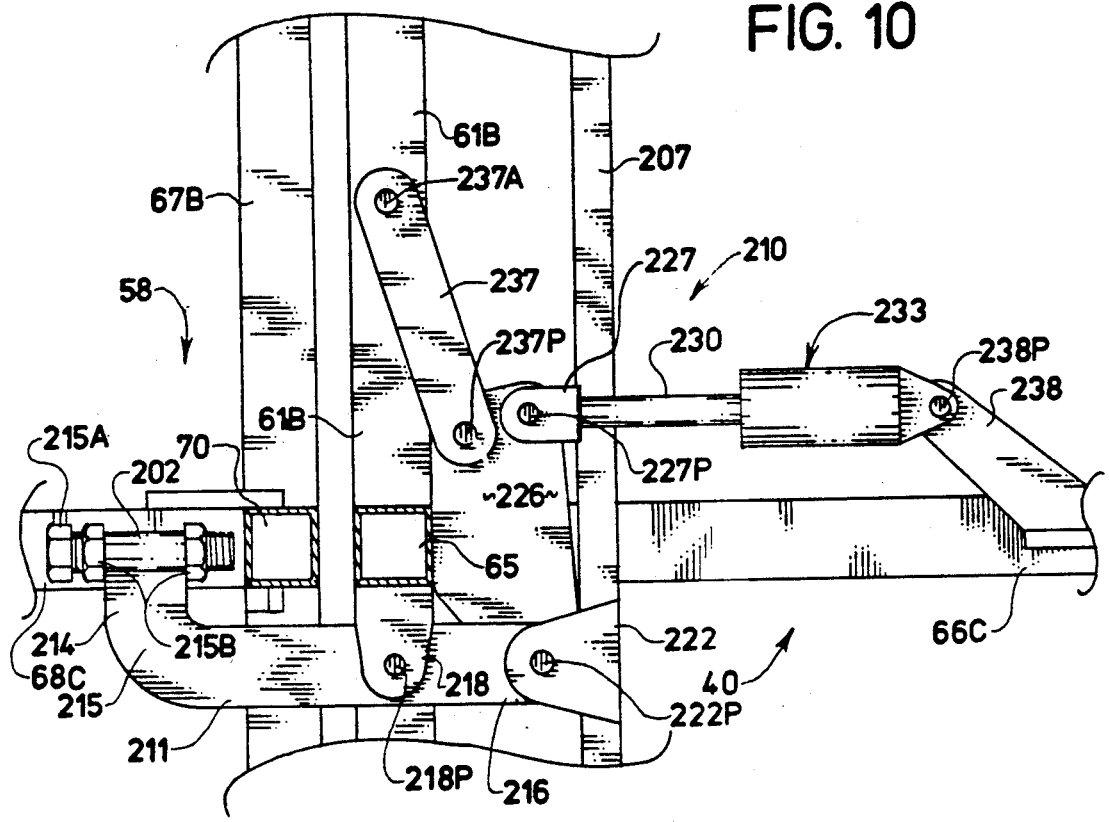
FIG. 10 is an enlarged, fragmentary, sectional view taken generally along line 10—10 of FIG. 6, illustrating the preferred locking system and the master locking linkage in a locked position.
Figure 11:
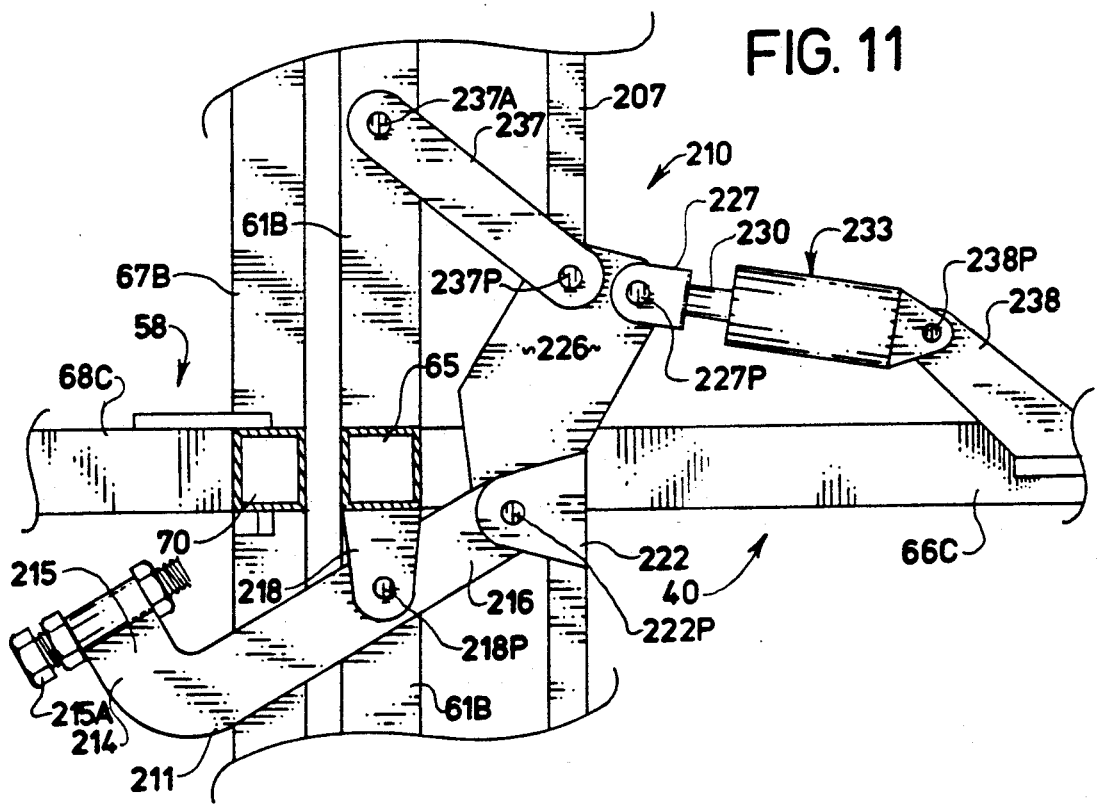
FIG. 11 is a sectional view similar to FIG. 10, illustrating the locking system in the unlocked position; and, FIG. 12 is an enlarged, fragmentary perspective view illustrating a typical blade assembly in which portions have been broken away for clarity.

In the best mode, a safety locking system 200 is provided for each wing 58, 60 to prevent inadvertent deflection of the wings during operation. To achieve a smooth field surface, care must be taken to assure that the wings and thus the scraper blades do not bounce upwardly when they contact a dirt mound to be planed. With reference directed to FIGS. 3, 10, and 11, an individual locking system is broadly designated by the reference numeral 200. In the interest of brevity and clarity herein, only one side of the locking system will be described, and it shall be understood that both sides are thereby disclosed.

System 200 comprises a pair of elongated, rigid synchronizers 207 which extend longitudinally interiorly of central frame 40 parallel with and spaced apart from and each wing. Locking linkage 210 forms the master locking device associated with the central lower frame cross member 66C, and a pair of spaced apart slave stations 210S are synchronized to it. In the best mode, master 210 is positioned beneath the hydraulic folding system.

Synchronizers 207 are pivotally linked to a plurality of rigid lock arms 211. Each lock arm 211 comprises a terminal end 214 having an adjustable hook portion 215 that wraps around an interior vertical support 70 of the wing (see FIG. 6). Hook 201 comprises a sleeve 202 that coaxially receives adjustment bolt 215A secured by nuts 215B. Adjustment bolt 215A may be selectively tightened or loosened against the vertical support 70 to adjust the degree of allowable deflection, or the tension applied to the wing by the locking arm.

The opposite, interior end 216 of arm 211 is pivotally anchored to a rigid tab 222 which projects from synchronizer 207 and terminates in a deflectable union 226. An intermediate pivot point 222P is defined by tab 222. Union 226 is in turn pivotally coupled by a clevis 227 to the ram 230 of a small hydraulic cylinder 233. Union 226 is also pivotally anchored on the central frame by a rigid lever 237. Lever 237 defines an interior pivot point 237A where it couples to union 226 and an exterior pivot point 237P at which it is coupled to member 61B.

Figure 6:
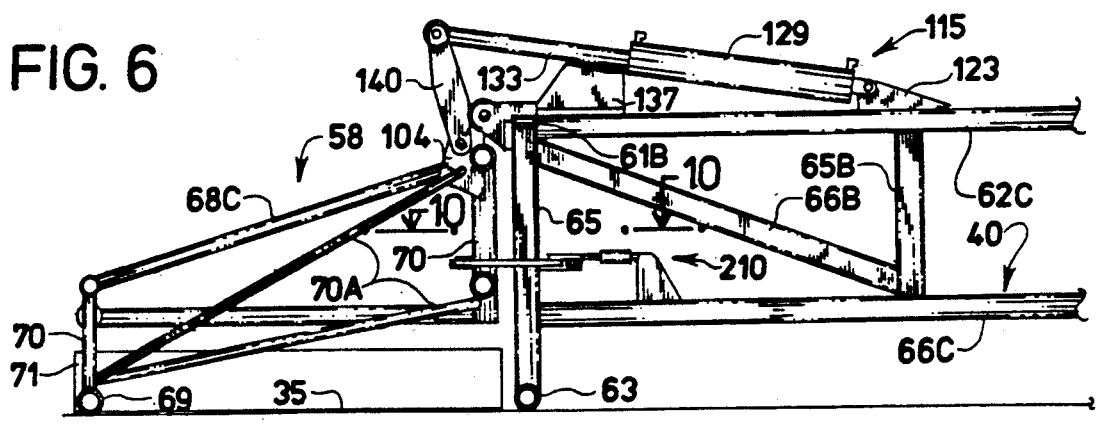

FIGS. 6 and 10 illustrate the master 210 in its locked position. The hydraulic cylinder 233 rests with its ram 230 extended roughly parallel and above the wing lower cross member 66C. In this position, union 226 rests between the central frame member 61 and synchronizer 207. The lock arm 211 rests generally parallel to central lower cross member 66C with its terminal end 214 resting generally on top of the wing cross member 68C. Terminal end 214 exerts pressure against the wing and thus prevents undesired upward deflection or bouncing of the wing during planing.

For example, on a field that has been dormant for some time, larger and more solid obstacles may be encountered. Under such circumstances, a great deal more deflection must be permitted to first clear larger obstacles and prevent damage to the machine. Under such circumstances, the lock arm should be loosely secured so that the wing deflects out of the way of potentially damaging structure. In a recently worked field, a smoother grade may be expected, and the lock arm may be adjusted to a tighter grip to prevent the blade from deflecting across smaller elevated areas that should be planed.

With reference now to FIG. 11, when it is desired to unlock the wing for folding, hydraulic cylinder 233 retracts ram 230. The ram draws union 226 toward the center of the frame, pivoting lever 237 upwardly about pivot point 237P toward the cylinder. As union 226 rotates, interior end 216 of the lock arm 211 is drawn toward the header. Arm 211 rotates about pivot point 218P, simultaneously drawing the terminal end 214 out of alignment with the wing lower cross member 68C. Thus the locking arm is cleared out of engagement with wing 60, so that the wing may be freely rotated upwardly into the folded, transport position.

In the best mode shown in FIG. 3, a plurality of slaves 210S are simultaneously activated along synchronizers 207 to lock all the wing sections. FIG. 10A illustrates one slave system 210S, and it shall be understood that the other slaves are thereby disclosed. As synchronizer 207 moves longitudinally adjacent frame member 61, lock arm 211S is pivoted about the pivot point 223P defined at tab 222S and 219P defined at tab 218S between the locked position shown in solid lines and the unlocked position indicated by dashed lines. One slave system 210S is associated with each of the other lower frame cross braces, and is independently adjustable for pre-selected tension by bolt assembly 215S.

Figure 12:
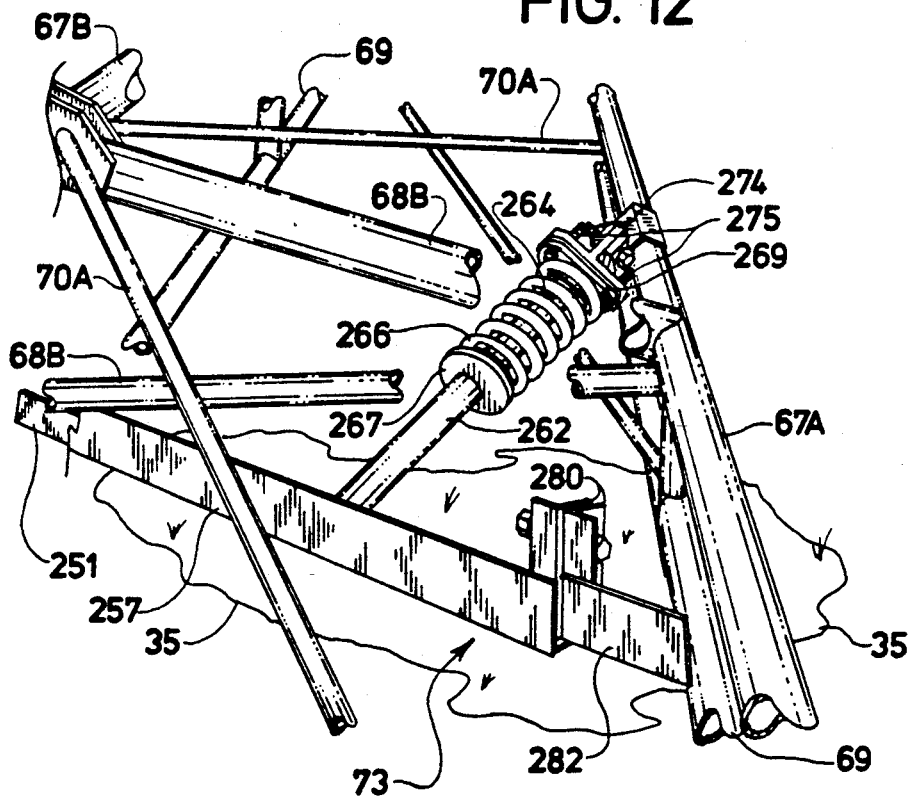

The wing locking system 200 thus described maximizes operating efficiency as the land plane glides over the field to be leveled, since no part of the field is left unplaned due to undesired deflection of the wing. As indicated, planing is accomplished as blades 71-77 are dragged across the surface of the field 35. With specific references directed to FIG. 12, the blades 71-77 comprise an elongated, preferably hardened steel blade 257 mounted upon a rigid, elongated angle member 251. In the best mode, the blades are preferably removably mounted to the angle member to facilitate maintenance and repair. The angle member is resiliently mounted upon the end of a rigid tubular sleeve 262. Sleeve 262 slidably receives a telescoping rod 264, which permits adjustment of the blade position relative to the frame. A resilient, shock-absorbing spring 266 is coaxially mounted upon rod 264 and biased between a rigid flange 267 and the rod terminal end 269. Terminal end 269 of the rod is coupled to blade bracket 274 by a pair of bolts 275, and the bracket 274 is secured to one of the tubular frame members.

The pre-tension on spring 266 may be decreased or increased to adjust the resilience of the blade in response to contact with obstacles on the field's surface. For example, where a field is preworked and relatively smooth, greater tension in spring 266 prevents the blade from deflecting out of the path of elevated mounds of soil. Under more severe conditions, less pre-tension is desired to prevent damage to the blades during initial planing stages. Pre-tension is adjusted by manipulation of bolts 275 to move terminal end 269 into or out of abutment with bracket 274. In the position shown in FIG. 12, bolts 275 are adjusted to permit maximum resilience of the rod relative to sleeve 262. As the blade contacts surface obstructions, sleeve slides freely along rod 264.

The height of the blade relative to the frame and field surface may also be adjusted. In the best mode, the outer edges of the angled member 251 are secured to vertical brackets 280 by nut-and-bolt assemblies. Vertical brackets 280 are welded to lower ring frame 69 by rigid tab 282. The operator need merely loosen the bolt assembly to reposition the blade at the desired elevation.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A folding land plane comprising:
   a wheeled, central frame adapted to be coupled to a tow vehicle, said frame comprising a front, a rear, and a pair of opposing, spaced apart sides;
   a pair of foldable wings pivotally mounted upon said sides between said front and said rear, said wings selectively automatically deployable between a transport position folded upon said central frame and a deployed position folded outwardly and downwardly adjacent said sides;
   means for selectively folding said wings relative to said central frame between said transport and deployed positions, said folding means comprising:
   hydraulic means for supplying power during folding;
   cam arm means pivoted to said hydraulic means for deflection thereby;
   rigid pivot plate means attached to said wing, said pivot plate means pivoted to said cam arm means; and,
   roller means for establishing a fulcrum for said cam arm means during folding of the wings; and,
   guide means for temporarily receiving and restraining at least a portion of said hydraulic means and said cam means during wing folding and unfolding
   means for automatically, temporarily locking said wings in said deployed position, said locking means comprising:
   a master comprising a pivoted union, a rotatable locking arm adapted to be driven into restraining contact with a portion of the wing; and an elongated synchronizer driven by said union; and,
   at least one slave remote from said master, said slave comprising a rotatable locking arm adapted to be driven into restraining contact with a portion of the wing in response to said synchronizer; and,
   hydraulic means for activating said master;
   offset, multiangled, cooperative scraper blade means associated with both said central frame and said wings for forcibly contacting and leveling ground laterally and longitudinally without ridging said ground, said scraper blade means comprises a plurality of rigid, elongated blades positioned diagonally across the bottom of said frame and the bottom of said wings, said blades aligned generally offset from one another.

2. The folding land plane as defined in claim 1 wherein said master further comprises a lever pivoted between said union and said frame, and means for pivotally joining said union, said arm, and said synchronizer; and,
   each locking arm comprises an adjustable hook portion for engaging the wing during locking.

3. The folding land plane as defined in claim 1 further comprising means for adjusting the height of said scraper blade means relative to said frame and said ground, and means for tensioning said scraper blade means to vary said blade's resilience responsive to impacts with surface obstacles.

4. A folding land plane comprising:
   a wheeled, central frame adapted to be coupled to a tow vehicle, said frame comprising a front, a rear, and a pair of opposing, spaced apart sides;
   a pair of foldable wings pivotally mounted upon said sides between said front and said rear, said wings selectively automatically deployable between a transport position folded upon said central frame and a deployed position folded outwardly and downwardly adjacent said sides;
   folding means for selectively folding said wings relative to said central frame between said transport and deployed positions, said folding means comprising:
   primary hydraulic means for supplying power during folding;
   cam arm means pivoted to said hydraulic means for deflection thereby;
   rigid pivot plate means attached to said wing, said pivot plate means pivoted to said cam arm means;
   roller means for establishing a fulcrum for said cam arm means during folding of said wings; and, guide means for temporarily receiving and restraining at least a portion of said hydraulic means and said cam means during wing folding and unfolding;

a plurality of rigid, elongated, removable blades positioned diagonally across the bottom of said frame and the bottom of said wings, said blades aligned generally offset from one another for forcibly contacting and leveling ground laterally and longitudinally;

locking means for automatically, temporarily locking said wings in said deployed position, said locking means comprising:
- a master comprising a pivoted union, a rotatable locking arm adapted to be driven into restraining contact with a portion of said wing; and an elongated synchronizer driven by said union;
- an adjustable hook portion extending from said arm for engaging said wing during locking;
- a lever pivoted between said union and said frame, and means for pivotally joining said union, said arm, and said synchronizer;
- secondary hydraulic means for activating said master; and,
- at least one slave remote from said master, said slave comprising a rotatable locking arm adapted to be driven into restraining contact with a portion of said wing in response to said synchronizer;

adjustment means for adjusting the height of said blades relative to said frame and said ground; and, tensioning means for tensioning said blades to vary said blade's resilience responsive to impacts with obstacles.

5. A land plane for leveling a field to be cultivated, said plane comprising:

a central frame adapted to be coupled to a tow vehicle, said frame comprising a front, a rear, and a pair of opposing sides, said frame selectively transportable upon a plurality of centrally disposed wheels;

wings pivotally coupled to at least one of said frame sides, said wings foldably deployable and retractable to expand the operative width of said plane;

at least one fluid-powered cylinder to fold and unfold said wings;

a cam arm pivoted to said cylinder;

rigid pivot plate means attached to said wing, said pivot plate means pivoted to and actuated by said cam arm;

a roller establishing a fulcrum for said cam arm means during folding of said wings;

guide means for temporarily receiving and restraining at least a portion of said hydraulic means and said cam means during wing folding and unfolding;

locking means for selectively locking said wings in a deployed position, comprising one or more locking masters each comprising a rigid locking arm pivoted to a synchronizer, a union pivoted to said synchronizer and a secondary hydraulic cylinder to actuate said union;

said locking means further comprising a plurality of locking slaves responsive to said synchronizer, each of said locking slaves comprising a rigid locking arm pivoted to said synchronizer;

a plurality of rigid, elongated blades positioned generally diagonally across said central frame and said wings, generally offset from one another, forcibly contacting and leveling said field;

adjusters extend between said frame or said wings and said blades, said adjusters allowing alteration of the height of said blades relative to said field and said frame or said wing; and, spring tensioners extend from said frame or said wings to said blades for selectively tensioning said blades to define said blade's resilience responsive to impacts with obstacles.

* * * * *